(12) United States Patent
Su et al.

(10) Patent No.: US 11,257,244 B2
(45) Date of Patent: Feb. 22, 2022

(54) METHOD AND DEVICE FOR POSITIONING INTELLIGENT TERMINAL APPARATUS, AS WELL AS INTELLIGENT TERMINAL APPARATUS ASSOCIATED THEREWITH

(71) Applicant: BOE TECHNOLOGY GROUP CO., LTD., Beijing (CN)

(72) Inventors: Haijun Su, Beijing (CN); Kai Zhao, Beijing (CN); Yue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 641 days.

(21) Appl. No.: 16/097,645

(22) PCT Filed: Feb. 26, 2018

(86) PCT No.: PCT/CN2018/077256
§ 371 (c)(1),
(2) Date: Oct. 30, 2018

(87) PCT Pub. No.: WO2018/214605
PCT Pub. Date: Nov. 29, 2018

(65) Prior Publication Data
US 2021/0225025 A1 Jul. 22, 2021

(30) Foreign Application Priority Data
May 24, 2017 (CN) .......................... 201710375174.X

(51) Int. Cl.
*G06T 7/246* (2017.01)
*G06T 7/73* (2017.01)
*G06K 9/62* (2022.01)

(52) U.S. Cl.
CPC .............. *G06T 7/73* (2017.01); *G06K 9/6212* (2013.01); *G06T 7/246* (2017.01)

(58) Field of Classification Search
CPC .......... G06T 7/73; G06T 7/246; G06K 9/6212
See application file for complete search history.

(56) References Cited

U.S. PATENT DOCUMENTS

2007/0156286 A1* 7/2007 Yamauchi ............ G05D 1/0251
700/245

FOREIGN PATENT DOCUMENTS

| CA | 2705731 A1 * | 8/2010 | ............... G06T 7/12 |
| CA | 2553477 C * | 8/2013 | ........... G01B 9/0203 |

(Continued)

OTHER PUBLICATIONS

Search Report and Written Opinion for International Application No. PCT/CN2018/077256 dated Apr. 28, 2018.

*Primary Examiner* — Matthew C Bella
*Assistant Examiner* — Kathleen M Broughton
(74) *Attorney, Agent, or Firm* — Calfee, Halter & Griswold LLP

(57) ABSTRACT

A method for positioning an intelligent terminal apparatus comprises: acquiring data points scanned by a position detection device in the intelligent terminal apparatus at the current position of the intelligent terminal apparatus; converting valid data points into segment features to obtain a first set of segment features; and converting point features in an established map of the intelligent terminal apparatus into segment features to obtain a second set of segment features; selecting, from the first and second set of segment features, segments having the same position relationship respectively to form a first and a second candidate subset of the first and the second set of segment features respectively; and determining a transformation matrix that matches the first candidate subset to the second candidate subset, and identifying (Continued)

the current position and the orientation angle of the intelligent terminal apparatus in the established map based on the transformation matrix.

20 Claims, 6 Drawing Sheets

(56) References Cited

FOREIGN PATENT DOCUMENTS

| | | | | |
|---|---|---|---|---|
| CN | 103659823 A | * | 3/2014 | ............ B25J 9/1682 |
| CN | 103853901 A | | 6/2014 | |
| CN | 105246039 A | | 1/2016 | |
| CN | 105424026 A | | 3/2016 | |
| CN | 106092104 A | | 11/2016 | |
| CN | 106573381 A | * | 4/2017 | ......... G06K 9/00664 |
| CN | 107204014 A | | 9/2017 | |
| JP | 2003005833 A | | 1/2003 | |
| JP | 2016076248 A | * | 5/2016 | ........... G05D 1/0238 |

* cited by examiner

METHOD AND DEVICE FOR POSITIONING INTELLIGENT TERMINAL APPARATUS, AS WELL AS INTELLIGENT TERMINAL APPARATUS ASSOCIATED THEREWITH

RELATED APPLICATION

The present application is the U.S. national phase entry of PCT/CN2018/077256, with an international filing date of Feb. 26, 2018, which claims the benefit of Chinese Patent Application No. 201710375174.X, filed on May 24, 2017, the entire disclosure of which is iii incorporated herein by reference.

FIELD

The present disclosure relates to the field of artificial intelligence technologies, and in particular to a method and a device for positioning an intelligent terminal apparatus, as well as an intelligent terminal apparatus associated therewith.

BACKGROUND

The simultaneous localization and mapping technology for an indoor robot is usually established on continuous motion of a robot, which obtains the robot's pose state and a map at any time through incremental odometer data and laser radar data. If, during the motion, the robot is manually or otherwise moved to another position, this may break the robot's state of continuous motion, and thus the robot cannot relocate its position and the mapping will fail.

In relevant prior art, in a LiDAR-based indoor robot navigation, a local matching is usually conducted mainly based on point features to obtain the current global position of the robot and provide an initial position for further navigation of the moved robot. However, the above local matching process is quite time-consuming, requires lots of computation and is quite difficult to use in practice.

SUMMARY

The present disclosure relates to a method and a device for positioning an intelligent terminal apparatus, as well as an associated intelligent terminal apparatus.

According to a first embodiment of the present disclosure, there is provided a method for positioning an intelligent terminal apparatus. The method comprises the steps of: acquiring data points scanned by a position detection device in the intelligent terminal apparatus at the current position iii of the intelligent terminal apparatus; converting valid data points into segment features to obtain a first set of segment features corresponding to the current position; and converting point features in the established map of the intelligent terminal apparatus into segment features to obtain a second set of segment features corresponding to an established map of the intelligent terminal apparatus; selecting segments having the same position relationship respectively from the first set of segment features and the second set of segment features to form a first candidate subset of the first set of segment features and a second candidate subset of the second set of segment features; and determining a transformation matrix that matches the first candidate subset to the second candidate subset, and identifying the current position and the orientation angle of the intelligent terminal apparatus in the established map based on the transformation matrix.

In some embodiments, before the acquiring step, the method further comprises the step of detecting the state of a suspension system in the intelligent terminal apparatus. If there is a record showing that the suspension system in the intelligent terminal apparatus was in a deployed state, and the suspension system is currently in a retracted state, the above-mentioned steps are carried out.

In some embodiments, the step of selecting segments having the same position relationship respectively from the first set of segment features and the second set of segment features comprises the steps of: analyzing the position relationship between every two segments in the first set of segment features, and analysing the position relationship between every two segments in the second set of segment features; comparing the position relationship between every two segments in the first set of segment features with the position relationship between every two segments in the second set of segment features; and when the position relationship between a first segment and a second segment in the first set of segment features being identical with the position relationship between a third segment and a fourth segment in the second set of segment features, selecting the first segment and the second segment from the first set of segment features and putting them into the first candidate subset of the first set of segment features, and selecting the third segment and the fourth segment from the second set of segment features and putting them into the second candidate subset of the second set of segment features.

In some embodiments, the step of analyzing the position relationship between every two segments comprises the step of calculating an angle difference between every two segments.

In some embodiments, the position relationship between the first segment and the second segment in the first set of segment features being identical with the position relationship between the third segment and the fourth segment in the second set of segment features comprises: the difference between a first angle difference between the first segment and the second segment and a second angle difference between the third segment and the fourth segment being smaller than or equal to a predetermined angle difference threshold.

In some embodiments, the valid data points are converted into segment features by Hough transformation, and the point features in the established map of the intelligent terminal apparatus are converted into segment features by Hough transformation.

In some embodiments, given that the first candidate set is O1 and the second candidate set is M1, the transformation matrix C is determined according to the following formula: $M1=C \times O1$; wherein the transformation matrix is represented by a translation vector and a rotation angle; and the current position and the orientation angle of the intelligent terminal apparatus are identified in the established map based on the translation vector and the rotation angle respectively.

In some embodiments, the step of determining a transformation matrix that matches the first candidate subset to the second candidate subset comprises the steps of: setting initial values for the translation vector and the rotation angle of the transformation matrix C; and performing at least two passes of iteration by using the initial values of the translation vector and the rotation angle as iteration initial values, calculating an error $E=\|M1-C \times O1\|^2$ for each pass of iteration, and obtaining an optimal solution of the transformation matrix C when the error E is minimum.

According to the second embodiment of the present disclosure, there is provided a device for positioning an intelligent terminal apparatus. The device comprises an acquisition module, a conversion module, a selection module and an identification module. The acquisition module is arranged to acquire data points scanned by a position detection device in the intelligent terminal apparatus at the current position of the intelligent terminal apparatus. The conversion module arranged to convert valid data points into segment features to obtain a first set of segment features corresponding to the current position, and convert point features in an established map of the intelligent terminal apparatus into segment features to obtain a second set of segment features corresponding to the established map of the intelligent terminal apparatus. The selection module arranged to select segments having the same position relationship respectively from the first set of segment features and the second set of segment features to form a first candidate subset of the first set of segment features and a second candidate subset of the second set of segment features. The identification module is arranged to determine a transformation matrix that matches the first candidate subset to the second candidate subset, and identify the current position and an orientation angle of the intelligent terminal apparatus in the established map based on the transformation matrix.

In some embodiments, the device further comprises a detection module for detecting the state of a suspension system in the intelligent terminal apparatus and recording a deployed state if the suspension system is deployed. The acquisition module is configured to be initiated to acquire the data points scanned by the position detection device in the intelligent terminal apparatus at the current position of the intelligent terminal apparatus when the detection module records the deployed state of the suspension system and the current state of the suspension system is detected as retracted.

In some embodiments, the selection module comprises an analysis sub-module, a comparison sub-module and a segment selection sub-module. The analysis sub-module is arranged to analyze the position relationship between every two segments in the first set of segment features and analyze the position relationship between every two segments in the second set of segment features before selecting segments having the same position relationship respectively from the first set of segment features and the second set of segment features. The comparison sub-module is arranged to compare the position relationship between every two segments in the first set of segment features with the position relationship between every two segments in the second set of segment features. The segment selection sub-module is arranged to select a first segment and a second segment from the first set of segment features and put them into the first candidate subset of the first set of segment features, and select a third segment and a fourth segment from the second set of segment features and put them into the second candidate subset of the second set of segment features, if the position relationship between the first segment and the second segment in the first set of segment features is identical with the position relationship between the third segment and the fourth segment in the second set of segment features.

According to a third embodiment of the present disclosure, there is provided an intelligent terminal apparatus. The intelligent terminal apparatus comprises one or more processors; and a storage device for storing one or more programs. The one or more programs, when executed by the one or more processors, cause the one or more processors to perform the above method.

According to a fourth embodiment of the present disclosure, there is provided a storage medium comprising computer executable instructions. The computer executable instructions are configured so as, when executed by a computer processor, to perform the above method.

According to the fifth embodiment of the present disclosure, there is provided an intelligent terminal apparatus. The intelligent terminal apparatus comprises a position detection device and a device for positioning the intelligent terminal apparatus as stated above.

The additional embodiments and advantages of the present disclosure will be partly provided in the following description, and become obvious in the following description, or be understood through the practise of the present disclosure.

BRIEF DESCRIPTION OF DRAWINGS

The above-mentioned and/or additional embodiments and advantages of the present disclosure will become obvious and easy to understand in the following description of embodiments with reference to the drawings, wherein.

DETAILED DESCRIPTION

Figure 1:
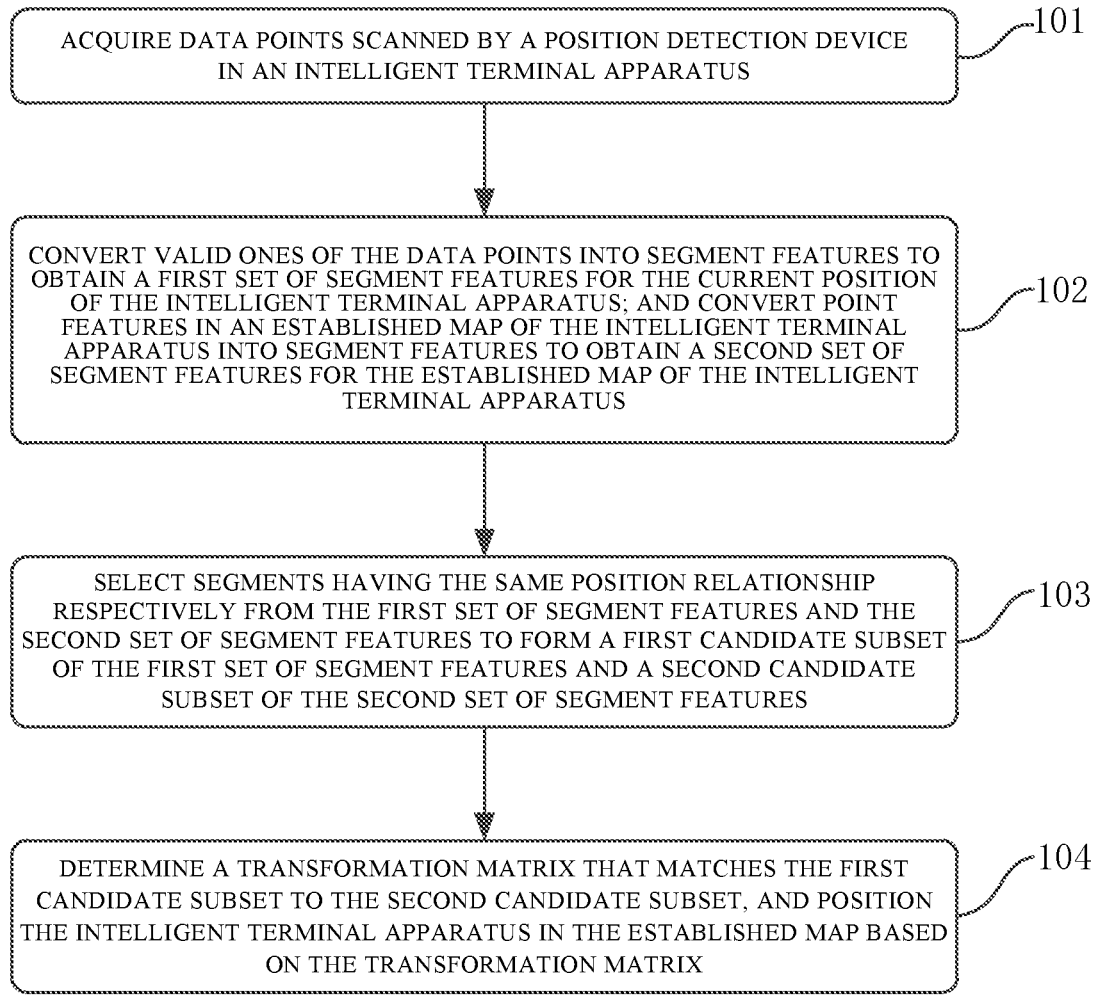
FIG. 1 is a flowchart showing an embodiment of a method for positioning an intelligent terminal apparatus according to the present disclosure.

The embodiments of the present disclosure will be described in detail below, and the examples of the embodiments are shown in the drawings, wherein same or similar references indicate same or similar elements or elements having same or similar functions throughout. The embodiments described with reference to the drawings are exemplary, and only used for explaining the present disclosure, and cannot be understood as limitations to the present disclosure. To the contrary, the embodiments of the present disclosure comprise all the variations, modifications and equivalents falling within the spirit and scope of the appended claims.

FIG. 1 is a flowchart showing an embodiment of a method for positioning an intelligent terminal apparatus according to the present disclosure. In some embodiments, the method is carried out by the intelligent terminal apparatus. The intelligent terminal apparatus may be a mobile intelligent terminal apparatus, including, but not limited to, shopping guide robots, food delivery robots, sweeping robots, etc.

In the step 101, data points scanned by a position detection device in the intelligent terminal apparatus are acquired. These acquired data points are those scanned at the current position of the intelligent terminal apparatus. In an embodiment, the data points may indicate the environment features at the current position, such as an environmental profile, an obstacle in an environment and the like.

The position detection device may be a device that may detect a position, e.g., the environment around the position, such as a laser radar or iii an infrared detector. Take a laser radar for example. It may emit lasers for rotary scanning to perceive the environment, e.g., to acquire the environmental profile information.

Since the position detection device may be interfered with during scanning or in consideration of the detection precision, the scanned data points may comprise invalid data points, which are noise points for feature extraction. For example, laser radar in operation may be greatly affected by the weather and atmosphere. When there is, e.g., smog in the environment, laser attenuation increases. At this time, the scanned data points may be noise points. For a higher positioning accuracy, only valid data points scanned by the position detection device are used in the positioning process according to an embodiment of the present disclosure. For example, valid data points may be extracted from the scanned data points by, e.g., such a pre-processing technology as edge extraction.

In the step 102, the valid data points in the aforesaid data points are converted into segment features to obtain a first set of segment features corresponding to the current position of the intelligent terminal apparatus. Meanwhile, point features in an established map of the intelligent terminal apparatus are converted into segment features to obtain a second set of segment features corresponding to the established map of the intelligent terminal apparatus. The point features in the established map may indicate the features of the environmental profile that has been constructed by the intelligent terminal apparatus in the previous movement.

In some embodiments, the valid data points in the aforesaid data points are converted into segment features by Hough transformation. As is known, the basic idea of the Hough transformation is the point-line duality. It performs a form of coordination transform on an image, to transform a curve or a line of a given shape in an original image domain into a point in a parameter space. A peak point is formed in the parameter space, thereby converting an issue of shape detection into an issue of peak statistics. In some embodiments, the Hough transformation makes the scanned valid data points, namely, points in the image domain, be transformed to the parameter domain. A point in the image domain may correspond to a line or a curve in the parameter domain, and the lines or the curves in the parameter domain corresponding to points on the same line in the image domain intersect at one point to form a peak. The peak point in the parameter domain corresponds to the segment formula parameter in the image domain and the segment of the image domain may be obtained by transformation of the parameter domain.

Figure 2:
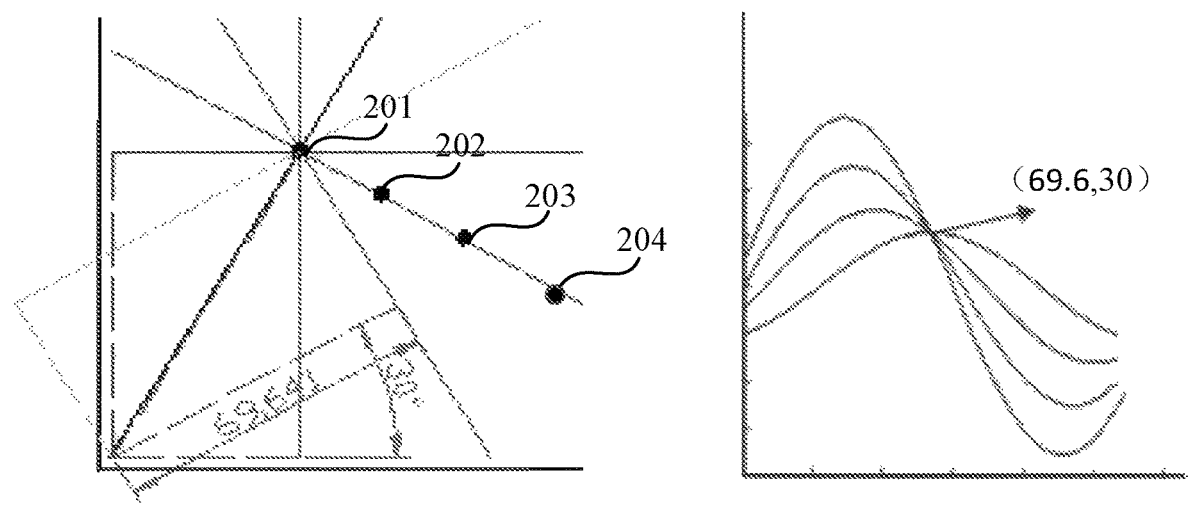
FIG. 2 is a schematic view showing detection of segments through a Hough transformation in a method for positioning the intelligent terminal apparatus according to the present disclosure.

FIG. 2 is a schematic view showing detection of segments by a Hough transformation in the method for positioning the intelligent terminal apparatus according to the present disclosure. FIG. 2 illustrates the image domain in the left part and the parameter domain in the right part. As shown in FIG. 2, there is a plurality of points, such as points 201, 202, 203, 204, in the image domain. By means of Hough transformation, individual points may correspond to respective curves in the parameter domain. The curves in the parameter domain intersect at one point $(\rho, \theta)$, e.g., (69.6, 30). This point in the parameter domain corresponds to the line represented by $(\rho, \theta)$ passing through the points 201, 202, 203, 204, wherein $\rho$ is the distance from the line to the origin, and $\theta$ is the angle between a vertical perpendicular to the line and the x-axis. Thus, the image feature is extracted.

For example, the above first set of segment features at the current position of the intelligent terminal apparatus obtained by the Hough transformation may correspondingly comprise n segments, which may be represented by $O=\{l_{o1}, l_{o2} \ldots l_{on}\}$.

Similarly, the above second set of segment features in the established map of the intelligent terminal apparatus obtained by the Hough transformation may correspondingly comprise k segments, which may be represented by $M=\{l_{m1}, l_{m2} \ldots l_{mk}\}$.

Now back to FIG. 1, in the step 103, segments having the same position relationship are selected respectively from the first set of segment features and the second set of segment features to form a first candidate subset of the first set of segment features and a second candidate subset of the second set of segment features. In some embodiments, the position relationship may include a parallel relationship or an intersectional relationship. In some embodiments, two segments are considered as a group to judge whether two groups of segments in the first segment feature set and the second segment feature set have the same position relationship. In some other embodiments, a plurality of segments may be considered as a group to judge whether two groups of segments have the same position relationship.

In the step 104, a transformation matrix that matches the first candidate subset to the second candidate subset is determined, and the intelligent terminal apparatus shall be positioned in the established map based on the transformation matrix. The step of positioning the intelligent terminal apparatus as above comprises identifying the current position and an orientation angle of the intelligent terminal apparatus.

Exemplarily, given that the first candidate set is O1 and the second candidate set is M1, the transformation matrix C is determined according to the following formula: M1=C× O1. In some embodiments, the transformation matrix C may be represented by a translation vector and a rotation angle.

In some embodiments, where the obtained first candidate subset is O1 and second candidate subset is M1, the transformation matrix may be determined in the following manner.

Firstly, the initial values of the translation vector and the rotation angle of the transformation matrix C are set. The initial values of the translation vector and the rotation angle are used as iteration initial values to perform at least two passes of iteration. An error $E=\|M1-C \times O1\|^2$ shall be calculated for each pass of iteration. When the error E is minimum, the optimal solution of the transformation matrix C is obtained, in such a way the transformation matrix C is determined. Alternatively, the transformation matrix C may be determined when the error E is less than a predetermined error requirement.

Exemplarily, the transformation matrix C may be expressed as $$C = \begin{bmatrix} R & T \\ 0 & 1 \end{bmatrix},$$

wherein T represents the translation vector, $$R = \begin{bmatrix} \cos\theta & \sin\theta \\ -\sin\theta & \cos\theta \end{bmatrix},$$

θ is the rotation angle. In an example, while solving the transformation matrix C, namely during the calculation process for solving the matrixes R and T, the initial transformation matrix $$C_0 = \begin{bmatrix} R_0 & T_0 \\ 0 & 1 \end{bmatrix}$$

may be obtained by initially supposing the rotation angle $\theta_0$ and the translation vector $T_0$, wherein $$R_0 = \begin{bmatrix} \cos\theta_0 & \sin\theta_0 \\ -\sin\theta_0 & \cos\theta_0 \end{bmatrix}.$$

The initial $E_0$ may be obtained using the transformation matrix $C_0$. The rotation angle $\theta_0$ and the translation vector $T_0$ may be used as initial iteration values to reduce the error through multiple passes of iteration to the minimal error $E_{min}$. The transformation matrix $C_{min}$ corresponding to the $E_{min}$ is determined as the optimal solution of the transformation matrix C. Correspondingly, the translation vector and the rotation angle corresponding to $C_{min}$ are arranged to identify the current position and the orientation angle of the intelligent terminal apparatus.

According to the method disclosed in the embodiment of the present disclosure, it is possible to use segment matching in the matching process by converting point features into segment features. This is helpful for shorten the time it takes to match, and therefore solves the problem in the prior art that point matching is time-consuming and inapplicable effectively.

Figure 3:
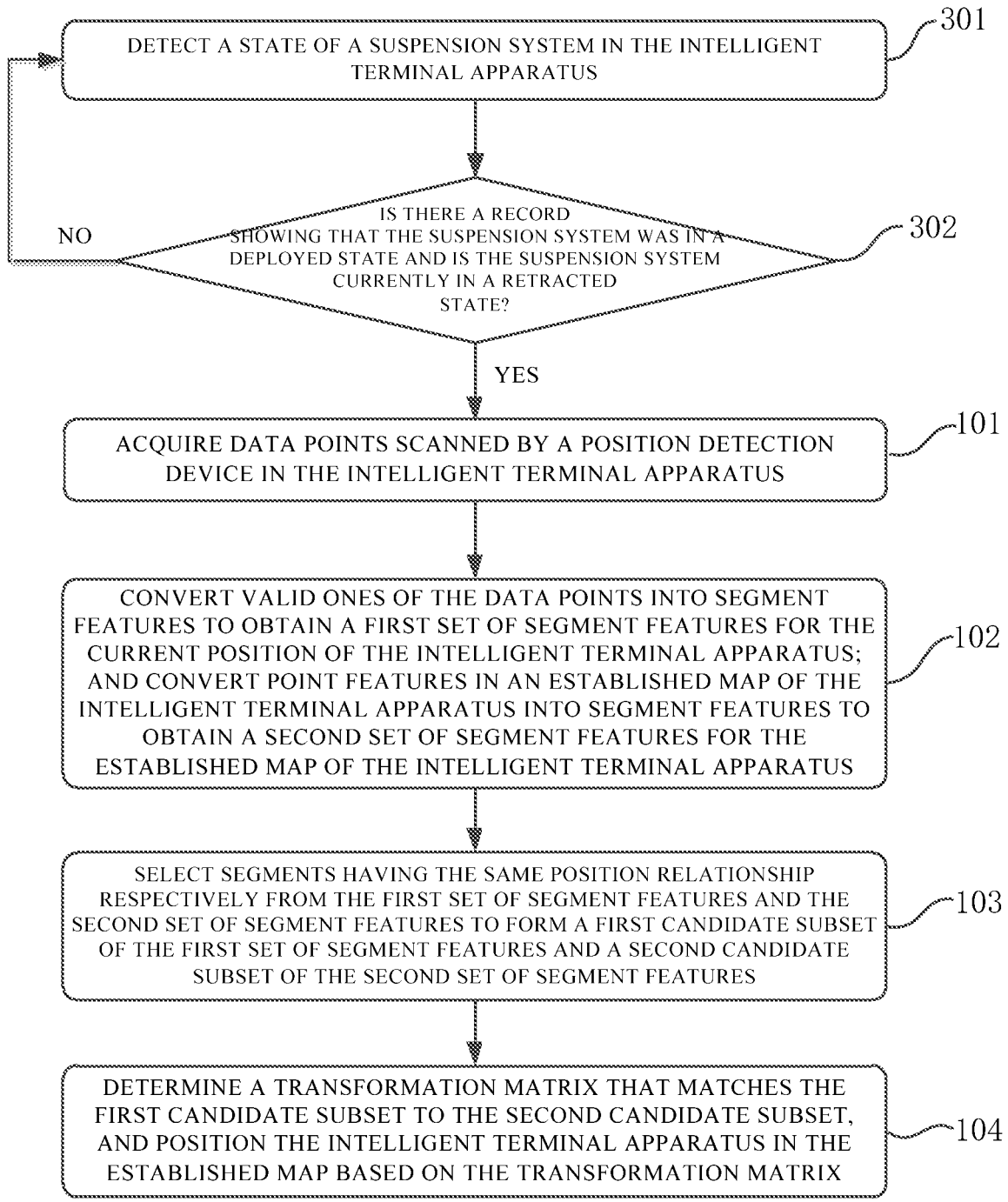
FIG. 3 is a flowchart showing another embodiment of the method for positioning the intelligent terminal apparatus according to the present disclosure.

FIG. 3 is a flowchart showing another embodiment of the method for positioning the intelligent terminal apparatus according to the present disclosure. The steps shown in FIG. 3 are similar to those in FIG. 1, with the difference lying in that the method shown in FIG. 1 also comprises the following steps prior to the step 101.

In the step 301, the state of a suspension system in the intelligent terminal apparatus is detected.

In the step 302, judgment shall be made on whether there is a record showing that the suspension system in the intelligent terminal apparatus was in a deployed state, and whether the suspension system is currently in a retracted state.

If yes, the steps shown in the method of FIG. 1, including steps 101-104, shall be carried out.

In some embodiments, if there is no record showing that the suspension system was in a deployed state or the suspension system is currently not in a retracted state, then the process returns to the step 301. Alternatively, the process may return to the step 301 in a predetermined interval to carry out the detection step.

In some embodiments, the intelligent terminal apparatus is for example a robot. If the suspension system in the robot is in a retracted state, it indicates that the suspension system in the robot is under stress, and then the robot is on the ground. At this point, the odometer data in the robot may be used for positioning and map-establishing simultaneously. If there is a record showing that the suspension system in the intelligent terminal apparatus was in a deployed state and the suspension system is currently in a retracted state, it means that the robot has ever been possibly moved off the ground and then moved to some position. Under such circumstances, it is necessary to re-position the robot by the method for positioning the intelligent terminal apparatus provided by the embodiment of the present disclosure.

Figure 4:
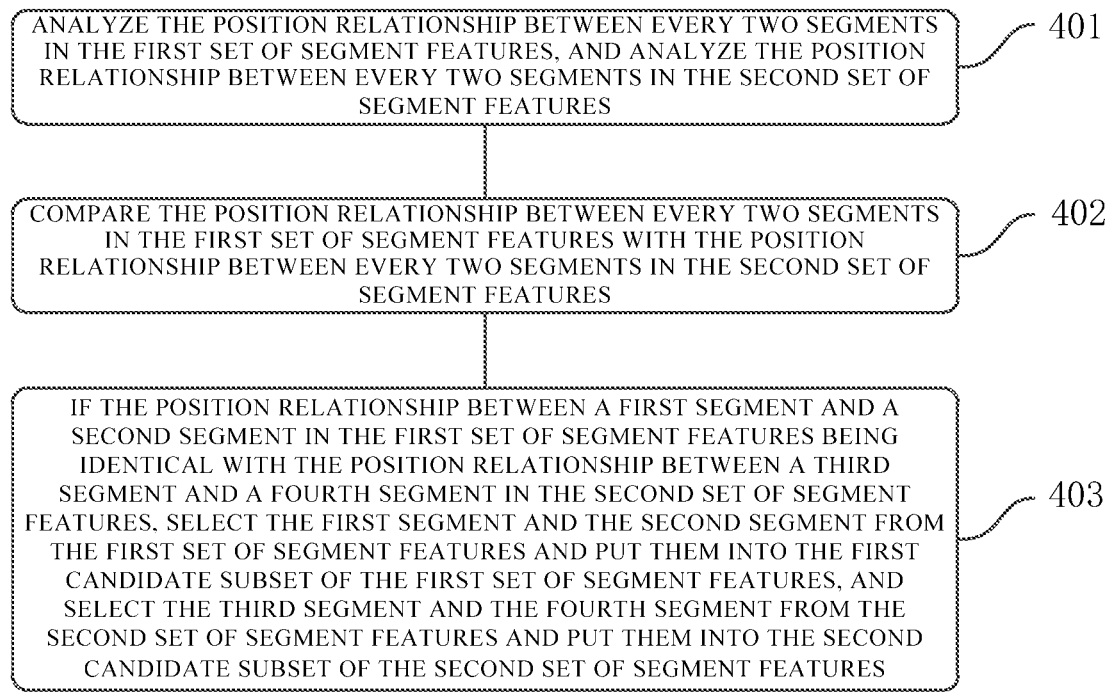
FIG. 4 is a flowchart showing a further embodiment of the method for positioning the intelligent terminal apparatus according to the present disclosure.

FIG. 4 is a flowchart showing a further embodiment of the method for positioning the intelligent terminal apparatus according to the present disclosure. As shown in FIG. 4, in the embodiment of the present disclosure, an algorithm for matching segment feature is adopted to obtain the relationship between the first set of segment features and the second set of segment features. Exemplarily, the algorithm for matching segment feature may be divided into two parts: first, it is required to analyze the mutual position relationship between segments in a set of segment features; and then it is required to determine whether the segment features match with each other by comparing and analyzing the obtained position relationships.

In the step 401, the position relationship between every two segments in the first set of segment features is analysed, and the position relationship between every two segments in the second set of segment features is analysed.

Exemplarily, as for a set comprising n segments, the position relationship between any two segments $l_i$ and $l_j$ may be described by an angle difference between two segments, namely $\Delta deg_{ij} = ||deg(l_i) - deg(l_j)||$. Thus, in the set comprising n segments, a set of position relationships between every two segments may be expressed as $D = \{\Delta deg_{11}, \Delta deg_{12}, \ldots, \Delta deg_{ij}\}$, wherein the dimension of D is $C_n^2$.

That is to say, the analyzing the position relationship between every two segments in the first set of segment features may be calculating the angle difference between every two segments in the first set of segment features; and the analyzing the position relationship between every two segments in the second set of segment features may be calculating the angle difference between every two segments in the second set of segment features.

As for the first set of segment features O, the set of position relationships DO between every two segments in the set O may be calculated. As for the second set of segment features M, the set of position relationships DM between every two segments in the set M may be calculated.

In the step 402, the position relationship between every two segments in the first set of segment features is compared with the position relationship between every two segments in the second set of segment features.

In some embodiments, comparison is made between respective elements, such as the angle difference, in the two sets of position relationships DO and MO.

In the step 403, if the position relationship between a first segment and a second segment in the first set of segment features is identical with the position relationship between a third segment and a fourth segment in the second set of segment features, the first segment and the second segment are selected from the first set of segment features and put into the first candidate subset of the first set of segment features, and the third segment and the fourth segment are selected from the second set of segment features and put into the second candidate subset of the second set of segment features.

Wherein, the first candidate subset of the first set of segment features O may be represented by O1, and the second candidate subset of the second set of segment features M may be represented by M1.

In some embodiments, the position relationship between the first segment and the second segment in the first set of segment features is a first angle difference between the first segment and the second segment in the first set of segment features; the position relationship between the third segment and the fourth segment in the second set of segment features is a second angle difference between the third segment and the fourth segment in the second set of segment features; the position relationship between the first segment and the second segment in the first set of segment features being identical with the position relationship between the third segment and the fourth segment in the second set of segment features comprises: a circumstance where the difference between the first angle difference between the first segment and the second segment and the second angle difference between the third segment and the fourth segment is smaller than or equal to a predetermined threshold. The predetermined threshold may be determined as appropriate according to the system performance (e.g., measurement precision) and/or requirements (e.g., positioning accuracy) in an implementation. The embodiment of the present disclosure is not necessarily limited to a certain threshold.

By selecting segment feature subsets made up by matched pairs that may exist from the first set of segment features and the second set of segment features according to position relationships, the number of combinations that may exist for calculating the transformation matrixes is reduced, which helps to shorten the time necessary for matching.

Figure 5:
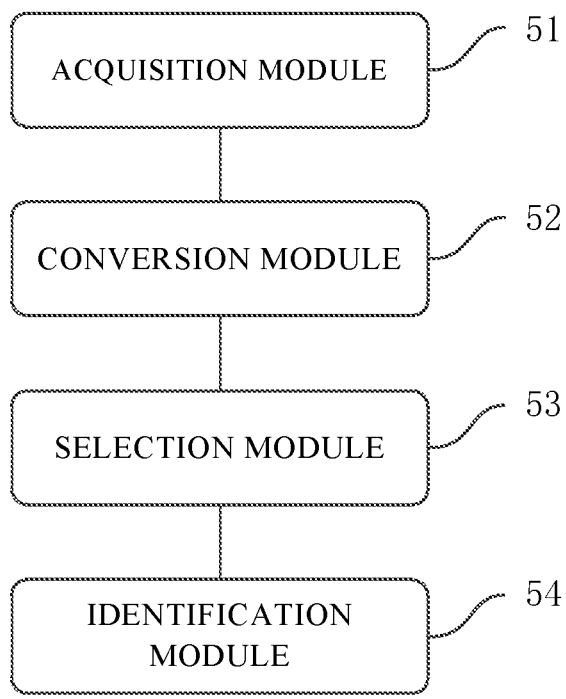
FIG. 5 is a structural schematic view of an embodiment of a device for positioning the intelligent terminal apparatus according to the present disclosure.

FIG. 5 is a structural schematic view of an embodiment of a device for positioning the intelligent terminal apparatus according to the present disclosure. The device for positioning the intelligent terminal apparatus in the embodiment may be, e.g., implemented as an intelligent terminal apparatus or a part of the intelligent terminal apparatus to implement the method for positioning the intelligent terminal apparatus provided by the embodiment of the present disclosure. As shown in FIG. 5, the device for positioning the intelligent terminal apparatus may comprise an acquisition module 51, a conversion module 52, a selection module 53 and an identification module 54.

The acquisition module 51 is arranged to acquire data points scanned by a position detection device in the intelligent terminal apparatus. The acquired data points may be the data points scanned by the position detection device at the current position of the intelligent terminal apparatus.

The conversion module 52 is arranged to convert valid data points acquired by the acquisition module 51 into segment features to obtain a first set of segment features corresponding to the current position of the intelligent terminal apparatus. Meanwhile, the conversion module 52 is arranged to convert point features in an established map of the intelligent terminal apparatus into segment features to obtain a second set of segment features corresponding to the established map of the intelligent terminal apparatus.

In some embodiments, the conversion module 52 is configured to exclude invalid data points from the acquired data points before conversion. Thus, only valid data points are used during the segment extraction process.

In some embodiments, the conversion module 52 converts the valid data points into segments by the Hough transformation to obtain the first set of segment features, and converts the point features in the established map of the intelligent terminal apparatus into segments by the Hough transformation to obtain the second set of segment features.

For example, the first set of segment features may be represented by $O=\{l_{o1}, l_{o2} \ldots l_{on}\}$. Similarly, the second set of segment features may be represented by $M=\{l_{m1}, l_{m2} \ldots l_{mk}\}$.

The selection module 53 is arranged to select segments having the same position relationship respectively from the first set of segment features and the second set of segment features as a first candidate subset of the first set of segment features and a second candidate subset of the second set of segment features.

The identification module 54 is arranged to determine a transformation matrix that matches the first candidate subset to the second candidate subset, and position the intelligent terminal apparatus, which includes identifying the current position and an orientation angle of the intelligent terminal apparatus, in the established map based on the transformation matrix.

Exemplarily, when the first candidate subset is O1, the second candidate subset is M1 and the transformation matrix is C, the transformation matrix C may be determined by the following formula: M1=C×O1. The transformation matrix may be represented by a translation vector and a rotation angle.

In some embodiments, the identification module 54 may be configured to set the initial values of the translation vector and the rotation angle of the transformation matrix and conduct at least two passes of iteration by using the initial values of the translation vector and the rotation angle as the initial values of the iteration. An error $E=\|M1-C\times O1\|^2$ is calculated for each pass of iteration. When the error E is minimum, the optimal solution of the transformation matrix C is obtained. Alternatively, the transformation matrix C may be determined when the error E is less than a predetermined error requirement.

For example, the transformation matrix may be expressed as $$C = \begin{bmatrix} R & T \\ 0 & 1 \end{bmatrix},$$

wherein T represents the translation vector, usually $$R = \begin{bmatrix} \cos\theta & \sin\theta \\ -\sin\theta & \cos\theta \end{bmatrix},$$

θ is the rotation angle between the first candidate subset and the second candidate subset. During the calculation process in which the identification module 54 solves the matrixes R and T, the error E may be reduced through multiple passes of iteration conducting on a basis of initially supposed rotation angle and translation vector to obtain the minimal error E and the optimal solution of the transformation matrix C simultaneously. Correspondingly, the translation vector and the rotation angle corresponding to the optimal solution of the transformation matrix C are used to identify the current position and the orientation angle of the intelligent terminal apparatus.

With the device for positioning the intelligent terminal apparatus according to the embodiment of the present disclosure, it is possible to employ segment matching in the matching process by converting point features into segment features. This is helpful for shorten the time it takes to match, and therefore solves the problem that point matching is time-consuming and inapplicable effectively.

Figure 6:
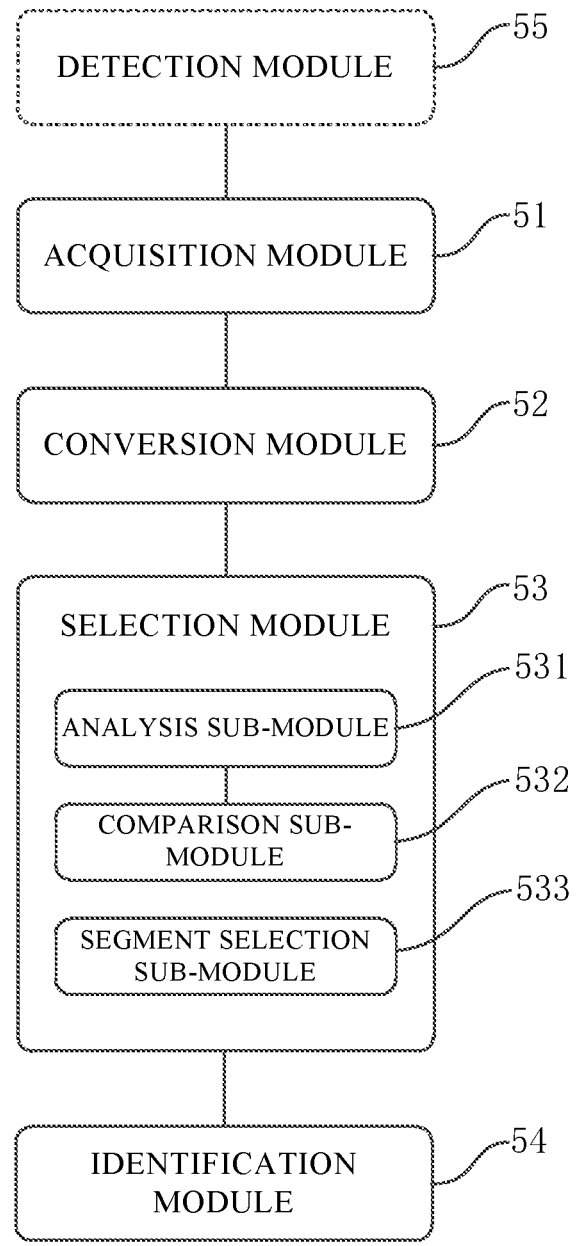
FIG. 6 is a structural schematic view of another embodiment of a device for positioning the intelligent terminal apparatus according to the present disclosure.

FIG. 6 is a structural schematic view of another embodiment of a device for positioning the intelligent terminal apparatus according to the present disclosure. The device for positioning as shown in FIG. 6 is similar to the one as shown in FIG. 5, with the difference lying in that the device for positioning the intelligent terminal apparatus in FIG. 6 may further comprise a detection module 55.

The detection module 55 may be arranged to detect the state of the suspension system in the intelligent terminal apparatus and record a deployed state if the suspension system is deployed.

The acquisition module 51 is configured to be initiated to acquire the data points scanned by a position detection device in the intelligent terminal apparatus when the detection module records a deployed state of the suspension system and the current state of the suspension system is detected as retracted.

Take a robot as an example of the intelligent terminal apparatus. If the suspension system in the robot is in a retracted state, it indicates that the suspension system in the robot is under stress, and therefore the robot is on the ground. Under such circumstances, the odometer data in the robot may be used for positioning and map-establishing simultaneously. If there is a record showing that the suspension system in the intelligent terminal apparatus was in a deployed state and the suspension system is currently in a retracted state, it means the robot may be moved off the ground and then moved to another position. At this time, it is necessary to re-position the robot by a device for positioning the intelligent terminal apparatus provided by the embodiment of the present disclosure.

In some embodiments, the selection module 53 further comprises an analysis sub-module 531 arranged to analyze the position relationship between each group of segments, e.g., every two segments, in the first set of segment features and analyze the position relationship between each group of segments, e.g., every two segments, in the second set of segment features before selecting segments having the same position relationship respectively from the first set of segment features and the second set of segment features.

An algorithm for matching segment feature may be adopted to obtain the relationship between the first set of segment features and the second set of segment features. Particularly, the algorithm for matching segment feature may be divided into two parts: first, the selection module 54 may analyze the mutual position relationship between segments. For example, as for a set comprising the features of n segments, the position relationship between any two segments $l_i$ and $l_j$ may be described by an angle difference between two segments, namely $\Delta deg_{ij}=|deg(l_i)-deg(l_j)|$. Thus, in the set comprising n segments, the set of the position relationship between every two segments may be expressed as $D=\{\Delta deg_{11}, \Delta deg_{12}, \ldots, \Delta deg_{ij}\}$, wherein the dimension of D is $C_n^2$.

That is to say, the analysis sub-module may be arranged to calculate the angle difference between every two segments in the first set of segment features, and to calculate the angle difference between every two segments in the second set of segment features.

As for the first set of segment features O, a set DO of position relationships between every two segments in the set O may be calculated. As for the second set of segment features M, a set DM of position relationships between every two segments in the set M may be calculated.

Furthermore, the selection module 53 may further comprise a comparison sub-module 532 and a segment selection sub-module 533.

The comparison sub-module 532 may be arranged to compare individual position relationships between every two segments in the first set of segment features with individual position relationships between every two segments in the second set of segment features.

The segment selection sub-module 533 may be arranged to select a first segment and a second segment from the first set of segment features and put them into a first candidate subset of the first set of segment features, and select a third segment and a fourth segment from the second set of segment features and put them into a second candidate subset of the second set of segment features if the position relationship between the first segment and the second segment in the first set of segment features is identical with the position relationship between the third segment and the fourth segment in the second set of segment features.

Wherein, the first candidate subset of the first set of segment features O may be represented by O1, and the second candidate subset of the second set of segment features M may be represented by M1.

In some embodiments, the analysis sub-module 531 may be configured to calculate the position relationship between the first segment and the second segment in the first set of segment features as a first angle difference between the first segment and the second segment in the first set of segment features, and calculate the position relationship between the third segment and the fourth segment in the second set of segment features as a second angle difference between the third segment and the fourth segment in the second set of segment features. The comparison sub-module 532 may be configured to compare the first angle difference with the second angle difference. The segment selection sub-module 533 may be configured to determine that the position relationship between the first segment and the second segment in the first set of segment features is identical with the position relationship between the third segment and the fourth segment in the second set of segment features when the difference between the first angle difference and the second angle difference is less than or equal to the predetermined threshold, and correspondingly select the first and second segments, as well as the third and fourth segments respectively.

The predetermined threshold may be determined as appropriate according to the system performance (e.g., measurement precision) and/or requirements (e.g., positioning accuracy) in an implementation.

According to the embodiment of the present disclosure, by selecting segment feature subsets made up by matched pairs that may exist from the first set of segment features and the second set of segment features according to position relationships, the number of combinations that may exist for calculating the transformation matrixes is reduced. This helps to shorten the time necessary for matching.

Figure 7:
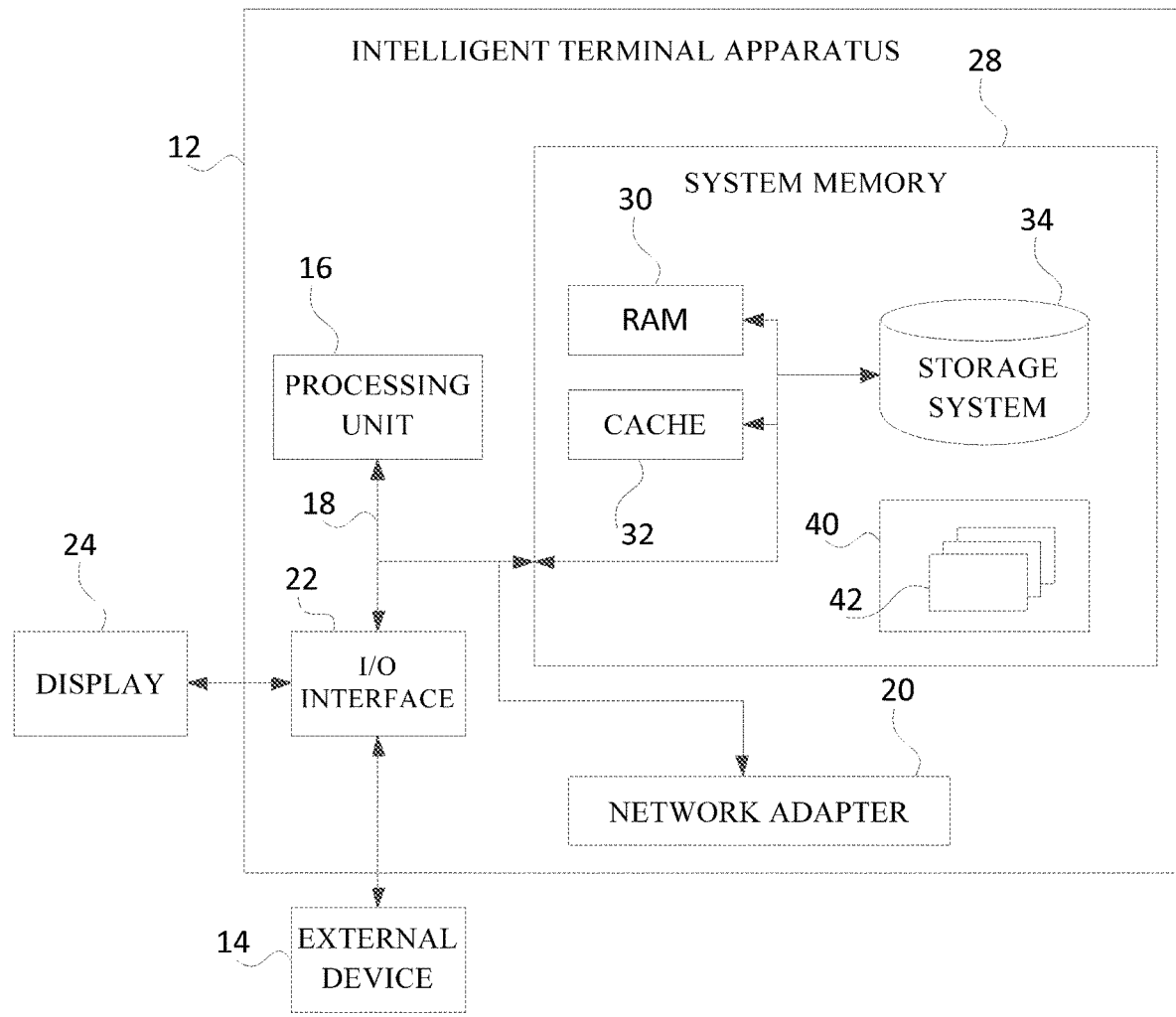
FIG. 7 is a structural schematic view of an embodiment of the intelligent terminal apparatus according to the present disclosure.

FIG. 7 illustrates a block diagram of an exemplary intelligent terminal apparatus 12 suitable for implementing the embodiments of the present disclosure. The intelligent terminal apparatus 12 in FIG. 7 is only an example and should not impose any limitation to the function and scope of the embodiments of the present disclosure.

As shown in FIG. 7, the intelligent terminal apparatus 12 is in a form of a general-purpose computing apparatus. The components of the intelligent terminal apparatus 12 may include, but not limited to, one or more processors or processing units 16, a system memory 28, a bus 18 connected to different system components (including the system memory 28 and processing units 16).

The bus 18 represents one or more of several bus architectures, including a memory bus or a memory controller, a peripheral bus, a graphics acceleration port, a processor or a local bus having any one of multiple bus architectures. For example, these architectures include, but not limited to, an Industry Standard Architecture (ISA) bus, a Micro Channel Architecture (MAC) bus, an augmented ISA bus, a Video Electronics Standards Association (VESA) bus and a Peripheral Component Interconnection (PCI) bus.

The intelligent terminal apparatus 12 typically comprises a plurality of computer system readable media. These media may be any usable medium accessible by the intelligent terminal apparatus 12, which includes volatile and non-volatile media, as well as removable and non-removable media.

The system memory 28 may comprise a computer system readable medium in a form of a volatile memory, such as a Random Access Memory (RAM) 30 and/or a cached memory 32. The intelligent terminal apparatus may further comprise other removable/non-removable or volatile/non-volatile computer system storage media. Just as an example, the storage system 34 may be arranged to read and write a non-removable and a non-volatile magnetic medium (not shown in FIG. 7 and commonly known as "a hard disk drive"). Though not shown in FIG. 7, it is possible to provide a magnetic disk drive for reading and writing a removable, non-volatile magnetic disk (e.g., a "floppy disk"), and a compact disc drive for reading and writing a removable, non-volatile compact disc (e.g., a Compact Disc Read Only Memory (CD-ROM)), a Digital Video Disc Read Only Memory (DVD-ROM) or other optical media). Under such circumstances, each drive may be coupled to the bus 18 by one or more data media interface. The memory 28 may comprise at least one program product having a set (e.g., at least one) of program modules, and these program modules are configured to execute the functions of the embodiments of the present disclosure.

A program/utility 40 having a set (at least one) of program modules 42 may be stored in, e.g., the memory 28. Such a program module 42 includes, but not limited to, an operating system, one or more applications, other program modules and program data, and one or any combination of these examples may comprise the implementation of the network environment. The program module 42 usually executes the function and/or method of the embodiment described in the present disclosure.

The intelligent terminal apparatus 12 may also communicate with one or more peripheral devices 14 (e.g., a keyboard, a pointing device or a display 24), with one or more apparatuses that enable users to interact with the intelligent terminal apparatus 12, and/or with any apparatus (e.g., a network card, a modem etc.) that enables the intelligent terminal apparatus 12 to communicate with one or more other computing apparatuses. The communication may be made through an input/output (I/O) interface 22. In addition, the intelligent terminal apparatus 12 may also communicate with one or more networks (e.g., a Local Area Network (LAN), a Wide Area Network (WAN) and/or a public network, like the Internet) through a network adapter 20. As shown in FIG. 7, the network adapter 20 communicates with other module of the intelligent terminal apparatus 12 through the bus 18. It should be understood that, though not shown in FIG. 7, other hardware and/or software modules, including, but not limited to, a microcode, a device driver, a redundant processing unit, an external disk drive array, a RAID system, a tape drive, a data backup storage system, and the like, may be used in conjunction with the intelligent terminal apparatus 12.

The processing unit 16 runs program(s) stored in the system memory 28 to thereby execute various functional applications and data processing, such as implementing a method for positioning the intelligent terminal apparatus as provided by the embodiment of the present disclosure.

Figure 8:
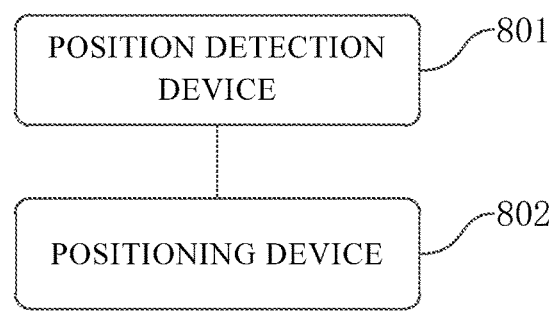
FIG. 8 is a structural schematic view of another embodiment of the intelligent terminal apparatus according to the present disclosure.

FIG. 8 is a structural schematic view of an embodiment of the intelligent terminal apparatus according to the present disclosure. The intelligent terminal apparatus in the embodiment may implement the method for positioning an intelligent terminal apparatus provided by the embodiment of the present disclosure. The intelligent terminal apparatus 800 may comprise a position detection device 801 and a positioning device 802 according to the embodiment of the present disclosure for acquiring data points scanned by the position detection device 801.

The embodiment of the present disclosure also provides a storage medium comprising a computer executable instruction. When executed by a computer processor, the computer executable instruction is arranged to carry out the method for positioning an intelligent terminal apparatus provided by the embodiment of the present disclosure.

The storage medium comprising a computer executable instruction may be any combination of one or more computer readable media. The computer readable medium may be a computer readable signal medium or a computer readable storage medium. The computer readable storage medium, for example, may be, but not limited to, an electric, magnetic, optical, electromagnetic, infra-red or semi-conductor system, device or means, or any combination thereof. More specific examples (non-exhaustive list) of the computer readable storage medium comprise an electronic connection having one or more wires, a portable computer disk, a hard disk, a Random Access Memory (RAM), a Read Only Memory (ROM), an Erasable Programmable Read Only Memory (EPROM), or a flash disk, an optical fiber, a portable CD-ROM, an optical storage device, a magnetic storage device, or any combination thereof. The computer readable storage medium herein may be any tangible medium comprising or storing a program, and the program may be used by or in combination with an instruction executing system, device or means.

The computer readable signal medium may comprise data signals transmitted in a baseband or as a part of a carrier, wherein a computer readable program code is carried. The transmitted data signal may be in various forms, including, but not limited to, an electromagnetic signal, an optical signal or any combination thereof. The computer readable signal medium may also be any computer readable medium in addition to the computer readable storage medium, and the computer readable medium may send, transmit or convey a program used by or in combination with an instruction executing system, device or means.

The program code contained in the computer readable medium may be transmitted by any suitable medium, including, but not limited to, wireless, wire, cable or RF, or any suitable combination thereof.

A computer program code for executing the operation of the present disclosure may be written in one or more programming languages or any combination thereof, and the programming language comprises an object-oriented programming language, such as Java, Smalltalk, C++, and a conventional process-oriented programming language, such as C language or a similar programming language. A program code may be wholly or partly executed in a user computer, executed as an independent software package, executed partly in a user computer and partly in a remote computer, or executed wholly in a remote computer or server. In a case where a remote computer is involved, the remote computer may be connected to a user computer by various networks, including a LAN or a WAN, or to an external computer (such as by the Internet provided by an Internet service provider).

It shall be noted that in the description of the present disclosure, the terms "first" or "second" are only used for illustration and shall not be understood as an indication or implication of relative importance. In addition, in the description of the present disclosure, "a plurality" means two or more, unless otherwise specified.

Any process or method described in the flowchart or otherwise described herein may be understood as including one or more modules, fragments or parts of a code of an executable instruction for implementing a step of a particular logical function or progress, and the scope of preferred embodiments of the present disclosure includes other implementations, wherein functions may be executed not in the shown or discussed order, including in a substantially simultaneous manner or in opposite order, according to the functions involved, which shall be understood by those skilled in the field of the embodiment of the present disclosure.

It shall be appreciated that the parts of the present disclosure may be implemented by hardware, software, firmware or any combination thereof. In the above embodiments, a plurality of steps or methods may be implemented by software or firmware stored in a storage and executed by a suitable instruction execution system. For example, if the steps or methods are implemented by hardware, just like in another embodiment, they may be implemented by any one of the following technologies known in the art or any combination thereof: a discrete logic circuit with logic gates for implementing logical functions of data signals, an ASIC with suitable combinational logic gate circuits, a Programmable Gate Array (PGA), and a Field Programmable Gate Array (FPGA).

Those ordinarily skilled in the art may understand that the steps of the method for implementing the above embodiments may, in its entirety or in part, be implemented through relevant hardware instructed by a program, and the program may be stored in a computer readable storage medium and, when executed, include one of the steps of the method embodiment or any combination thereof.

Moreover, functional modules in the embodiments of the present disclosure may be integrated in a processing module, or exist separately, or two or more modules may be integrated in a module. The integrated module may be implemented in a form of hardware, or a software functional module. The integrated module, if implemented in the form of a software functional module and sold or used as a stand-alone product, may also be stored in a computer readable storage medium.

The storage medium as mentioned above may be a ROM, a disk, a compact disk, etc.

In the description, the reference terms "an embodiment", "some embodiments", "examples", "specific examples" or "some examples" mean that specific features, structures, materials or characteristics described in combination with an embodiment or example are included in at least one embodiment or example of the present disclosure. In the description, schematic description of those terms does not necessarily refer to the same embodiments or examples. Additionally, specific features, structures, materials or characteristics as described may be combined in a suitable manner in any one or more embodiments or examples.

Although the embodiments of the present disclosure have been shown and described, it shall be understood that the embodiments are exemplary, and not a limitation to the present disclosure. Those ordinarily skilled in the art may make variations, modifications, replacements and changes to the embodiments within the scope of the present disclosure.

The invention claimed is:

1. A method for positioning an intelligent terminal apparatus, comprising the steps of:
   a) acquiring data points scanned by a position detection device in the intelligent terminal apparatus at the current position of the intelligent terminal apparatus;
   b) converting valid data points of the data points into segment features to obtain a first set of segment features corresponding to the current position; and converting point features in an established map of the intelligent terminal apparatus into segment features to obtain a second set of segment features corresponding to the established map of the intelligent terminal apparatus, wherein each of the valid data points is converted to a corresponding segment feature, and each of the point features is converted to a corresponding segment feature;
   c) selecting segments having the same position relationship respectively from the first set of segment features and the second set of segment features to form a first candidate subset of the first set of segment features and a second candidate subset of the second set of segment features; and
   d) determining a transformation matrix that matches the first candidate subset to the second candidate subset, and identifying the current position and the orientation angle of the intelligent terminal apparatus in the established map based on the transformation matrix.

2. The method according to claim 1, wherein before the acquiring step, the method further comprises:
   detecting a state of a suspension system in the intelligent terminal apparatus; and
   carrying out the steps a)-d), if there is a record showing that the suspension system in the intelligent terminal apparatus was in a deployed state, and the suspension system is currently in a retracted state.

3. The method according to claim 1, wherein said selecting segments having the same position relationship respectively from the first set of segment features and the second set of segment features comprises:
   analyzing the position relationship between every two segments in the first set of segment features, and analyzing the position relationship between every two segments in the second set of segment features;
   comparing the position relationship between every two segments in the first set of segment features with the position relationship between every two segments in the second set of segment features; and
   when the position relationship between a first segment and a second segment in the first set of segment features being identical with the position relationship between a third segment and a fourth segment in the second set of segment features, selecting the first segment and the second segment from the first set of segment features and putting them into the first candidate subset of the first set of segment features, and selecting the third segment and the fourth segment from the second set of segment features and putting them into the second candidate subset of the second set of segment features.

4. The method according to claim 3, wherein said analyzing the position relationship between every two segments comprises calculating an angle difference between every two segments.

5. The method according to claim 4, wherein the position relationship between the first segment and the second segment in the first set of segment features being identical with the position relationship between the third segment and the fourth segment in the second set of segment features comprises: a difference between a first angle difference between the first segment and the second segment and a second angle difference between the third segment and the fourth segment being smaller than or equal to a predetermined angle difference threshold.

6. The method according to claim 1, wherein the valid data points are converted into segment features by Hough transformation, and the point features in the established map of the intelligent terminal apparatus are converted into segment features by Hough transformation.

7. The method according to claim 1, wherein given that the first candidate set is O1 and the second candidate set is M1, the transformation matrix C is determined according to the following formula: M1=C×O1;
wherein the transformation matrix is represented by a translation vector and a rotation angle; and
the current position and the orientation angle of the intelligent terminal apparatus are identified in the established map based on the translation vector and the rotation angle respectively.

8. The method according to claim 7, wherein said determining a transformation matrix that matches the first candidate subset to the second candidate subset comprises:
setting initial values for the translation vector and the rotation angle of the transformation matrix C; and
performing at least two passes of iteration by using initial values of the translation vector and the rotation angle as iteration initial values, calculating an error $E=\|M1-C\times O1\|^2$ for each pass of iteration, and obtaining an optimal solution of the transformation matrix C when the error E is minimum.

9. A device for positioning an intelligent terminal apparatus, comprising:
an acquisition module arranged to acquire data points scanned by a position detection device in the intelligent terminal apparatus at the current position of the intelligent terminal apparatus;
a conversion module arranged to convert valid data points of the data points into segment features to obtain a first set of segment features corresponding to the current position, and convert point features in an established map of the intelligent terminal apparatus into segment features to obtain a second set of segment features corresponding to the established map of the intelligent terminal apparatus, wherein one data point is converted to one corresponding segment feature, and one point feature is converted to one corresponding segment feature;
a selection module arranged to select segments having the same position relationship respectively from the first set of segment features and the second set of segment features to form a first candidate subset of the first set of segment features and a second candidate subset of the second set of segment features; and
an identification module arranged to determine a transformation matrix that matches the first candidate subset to the second candidate subset, and identify the current position and an orientation angle of the intelligent terminal apparatus in the established map based on the transformation matrix.

10. The device according to claim 9, wherein the device further comprises:
a detection module arranged to detect the state of a suspension system in the intelligent terminal apparatus, and record a deployed state if the suspension system is deployed; and
the acquisition module configured to be initiated to acquire the data points scanned by the position detection device in the intelligent terminal apparatus at the current position of the intelligent terminal apparatus when the detection module records the deployed state of the suspension system and the current state of the suspension system is detected as retracted.

11. The device according to claim 9, wherein the selection module comprises:
an analysis sub-module arranged to analyze the position relationship between every two segments in the first set of segment features and analyze the position relationship between every two segments in the second set of segment features before selecting segments having the same position relationship respectively from the first set of segment features and the second set of segment features;
a comparison sub-module arranged to compare the position relationship between every two segments in the first set of segment features with the position relationship between every two segments in the second set of segment features; and
a segment selection sub-module arranged to select a first segment and a second segment from the first set of segment features and put them into the first candidate subset of the first set of segment features, and select a third segment and a fourth segment from the second set of segment features and put them into a second candidate subset of the second set of segment features, if the position relationship between the first segment and the second segment in the first set of segment features is identical with the position relationship between the third segment and the fourth segment in the second set of segment features.

12. The device according to claim 11, wherein the analysis sub-module is configured to analyze the position relationship between every two segments by calculating an angle difference between the every two segments.

13. The device according to claim 12, wherein the position relationship between the first segment and the second segment in the first set of segment features being identical with the position relationship between the third segment and the fourth segment in the second set of segment features comprises: the difference between a first angle difference between the first segment and the second segment and a second angle difference between the third segment and the fourth segment being smaller than or equal to a predetermined threshold.

14. The device according to claim 9, wherein the conversion module is configured to convert the valid data points in the data points into segment features by Hough transformation, and convert the point features in the established map of the intelligent terminal apparatus into segment features by Hough transformation.

15. The device according to claim 9, wherein given that the first candidate set is O1 and the second candidate set is M1, the identification module determines the transformation matrix C according to the following formula: M1=C×O1;

wherein the transformation matrix is represented by a translation vector and a rotation angle; and the identification module identifies the current position and the orientation angle of the intelligent terminal apparatus in the established map based on the translation vector and the rotation angle respectively.

16. The device according to claim 15, wherein the identification module is configured to determine the transformation matrix by:

setting initial values for the translation vector and the rotation angle of the transformation matrix C, performing at least two passes of iteration by using initial values of the translation vector and the rotation angle as iteration initial values, calculating an error $E=\|M1-C\times O1\|^2$ for each pass of iteration, and obtaining an optimal solution of the transformation matrix C when the error E is minimum.

17. An intelligent terminal apparatus, comprising:
one or more processors;
a storage device for storing one or more programs;
wherein the one or more programs when executed by the one or more processors causes the one or more processors to perform the method according to claim 1.

18. A non-transitory storage medium comprising computer executable instructions, wherein the computer executable instructions are configured so as when executed by a computer processor to perform the method according to claim 1.

19. An intelligent terminal apparatus, comprising:
a position detection device, and
a device for positioning the intelligent terminal apparatus according to claim 9.

20. The non-transitory storage medium according to claim 18, wherein given that the first candidate set is O1 and the second candidate set is M1, the transformation matrix C is determined according to the following formula: M1=C×O1;

wherein the transformation matrix is represented by a translation vector and a rotation angle; and the current position and the orientation angle of the intelligent terminal apparatus are identified in the established map based on the translation vector and the rotation angle respectively.

* * * * *